US008024285B2

(12) United States Patent
Bilenko et al.

(10) Patent No.: US 8,024,285 B2
(45) Date of Patent: Sep. 20, 2011

(54) DETERMINING QUALITY OF TIER ASSIGNMENTS

(75) Inventors: Mikhail Bilenko, Bellevue, WA (US); Miles Arthur Munson, Groton, NY (US)

(73) Assignee: Microsoft Corporation, Redmond, WA (US)

( * ) Notice: Subject to any disclaimer, the term of this patent is extended or adjusted under 35 U.S.C. 154(b) by 909 days.

(21) Appl. No.: 11/964,729

(22) Filed: Dec. 27, 2007

(65) Prior Publication Data

US 2009/0171867 A1 Jul. 2, 2009

(51) Int. Cl.
*G06F 17/00* (2006.01)
*G06N 7/00* (2006.01)
*G06N 7/08* (2006.01)

(52) U.S. Cl. .......................................... 706/59
(58) Field of Classification Search ...................... 706/59
See application file for complete search history.

(56) References Cited

U.S. PATENT DOCUMENTS

| | | | |
|---|---|---|---|
| 6,272,507 B1 | 8/2001 | Pirolli et al. | |
| 7,133,870 B1 | 11/2006 | Tripp et al. | |
| 7,240,064 B2 | 7/2007 | Risvik et al. | |
| 2002/0032772 A1 | 3/2002 | Olstad et al. | |
| 2002/0116394 A1 | 8/2002 | Van Doorn | |
| 2003/0212737 A1 | 11/2003 | Moricz et al. | |
| 2005/0004943 A1 | 1/2005 | Chang | |
| 2006/0015498 A1* | 1/2006 | Sarmiento et al. | 707/6 |
| 2006/0026191 A1 | 2/2006 | McSherry | |
| 2006/0150094 A1* | 7/2006 | Patrawala | 715/520 |
| 2006/0179053 A1 | 8/2006 | von Ahn Arellano et al. | |
| 2007/0011148 A1* | 1/2007 | Burkey et al. | 707/3 |
| 2007/0094285 A1 | 4/2007 | Agichtein et al. | |
| 2007/0185934 A1* | 8/2007 | Cannon et al. | 707/204 |
| 2007/0244868 A1 | 10/2007 | Grubb et al. | |

FOREIGN PATENT DOCUMENTS

| | | |
|---|---|---|
| JP | 09-081630 A | 3/1997 |
| KR | 10-2002-0069892 A | 9/2002 |
| KR | 10-2004-0023376 A | 3/2004 |
| WO | 2004102426 A1 | 11/2004 |

OTHER PUBLICATIONS

'Personalizing Search via Automated Analysis of Interests and Activities': Teevan, 2005, ACM, SIGIR 05 Aug. 15-19, pp. 449-456.*
International Search Report and Written Opinion Received for PCT Application No. PCT/US2008/082983 mailed on Mar. 31, 2009, 12 pages.
Suel, et al., "ODISSEA: A Peer-to-Peer Architecture for Scalable Web Search and Information Retrieval", Date: Jun. 2003, Department of Computer and Information Science, Brooklyn, NY.

(Continued)

*Primary Examiner* — Omar F Fernandez Rivas
*Assistant Examiner* — Peter Coughlan

(57) ABSTRACT

Described herein is a method that includes receiving user history data and generating an indication of quality of a tier assignment used to store searchable digital items in a tiered storage system, wherein the indication is based at least in part upon a subset of the user history data. Also described herein is a system that includes a receiver component that receives user history data. The system further includes a quality indicator component that determines an indication of quality of a tier assignment used to store digital items that are retrievable by way of querying, wherein the quality indicator component generates the indication based at least in part upon a subset of the user history data and the tier assignment indicates where digital items are to be stored in a tiered storage system.

20 Claims, 9 Drawing Sheets

OTHER PUBLICATIONS

Theobald, et al., "The XXL Search Engine: Ranked Retrieval of XML Data Using Indexes and Ontologies", Date: Jun. 4-6, 2002, University of the Saarland, Saarbrücken, Germany.

Wang, et al., "Computing PageRank in a Distributed Internet Search System", Date: Jun. 2004, University of Wisconsin—Madison, USA.

* cited by examiner

DETERMINING QUALITY OF TIER ASSIGNMENTS

BACKGROUND

Search engines have enabled users to quickly access information over the Internet. Specifically, a user can submit a query to a search engine and peruse ranked results returned by the search engine. For example, a user can provide a search engine with the query "Spider" and be provided with web pages relating to various arachnids, web pages relating to automobiles, web pages relating to films, web pages related to web crawlers, and other web pages. Search engines may also be used to return images, academic papers, videos, and other information to an issuer of a query.

Operation of a search engine may include employment of web crawlers to locate and store a large amount of information (e.g., web pages) that is available on the World Wide Web. For example, web pages or information pertaining thereto may be stored in a search engine index, which is used (in connection with one or more search algorithms) when queries are received.

Conventionally a search engine index is stored in several tiers, wherein different tiers provide different levels of performance. The tiering of the search engine index is analogous to the memory hierarchy used in computer architecture: overall storage capacity of the index is divided between different levels that vary in size, speed, latency, and cost. Higher tiers of the index typically have higher speed but have smaller capacity and higher cost. Accordingly, it is desirable to carefully index web pages to maximize efficiency of the search engine.

One manner for tiering web pages that has been used is to select a tier of an index in which to place a web page as a function of the web page's relative importance as determined by some metric, such as a static rank of the web page. Specifically, a number of links to a web page may be used to select a tier of an index in which to locate the web page. The relative importance of the page, however, is not necessarily indicative of whether the page is frequently accessed, and thus may be suboptimal for indexing web pages in a search engine index. Evaluating tier assignment is a difficult problem, however, because it is unclear which metrics capture the quality of a particular allocation of web pages to the tiers.

SUMMARY

The following is a brief summary of subject matter that is described in greater detail herein. This summary is not intended to be limiting as to the scope of the claims.

Various technologies relating to tiering digital items (such as web pages) are described herein. User interaction with a search engine, database management system, or the like can be monitored and data can be collected relating to such user interaction. For example, queries submitted by users, search results (e.g., digital items) provided in response to the queries, and user actions with respect to the search results can be monitored and retained. In a particular example, a toolbar on a browser can be used to collect the user history data. Based at least in part upon the user history data, an indication of quality of a tier assignment for searchable digital items can be generated, wherein a tier assignment indicates to which of several tiers searchable digital items are assigned. The indication of quality of the tier may be a value that accords to a defined tier assignment quality metric, which is described in detail herein.

In an example, the indication of quality may be determined by ascertaining several parameters. For instance, the indication of quality of the tier assignment may be based at least in part upon weights that are assigned to observed queries. In an example, the weights may be indicative of relative importance of the queries, and may be based at least in part upon frequency of issuance of the queries. In another example, the indication of quality of the tier assignment may be based at least in part upon a probability that, for a particular query and a determined system load (e.g., how busy a system is when the query is received), retrieval of digital items will end in a specified tier. The probability may be determined for multiple tiers. In yet another example, the indication of quality of the tier assignment may be based at least in part upon a measure of search result quality obtained when retrieval ends in a particular tier. Normalized Discounted Cumulative Gain, Mean Average Precision, Q-measure, or other suitable mechanisms for measuring information retrieval loss or search result quality may be used in connection with determining the measure of tiering quality.

In addition, an improved tier assignment can be generated based at least in part upon the indication of quality of tier assignment and/or the user history data. For example, the indication of quality of tier assignment may conform to a defined tier assignment quality metric, and an improved tier assignment may be optimized or substantially optimized with respect to the metric. Furthermore, a tiering policy can be updated based at least in part upon the improved tier assignment. A tiering policy is a policy that is used to assign digital items to tiers, and can take into account various features that correspond to a digital item, such as a number of times the digital item has been accessed by a user, size of the digital item, and the like. The tiering policy can be updated through the use of machine learning techniques, for example.

Other aspects of the present application will be appreciated upon reading and understanding the attached figures and description.

DETAILED DESCRIPTION

Figure 1:
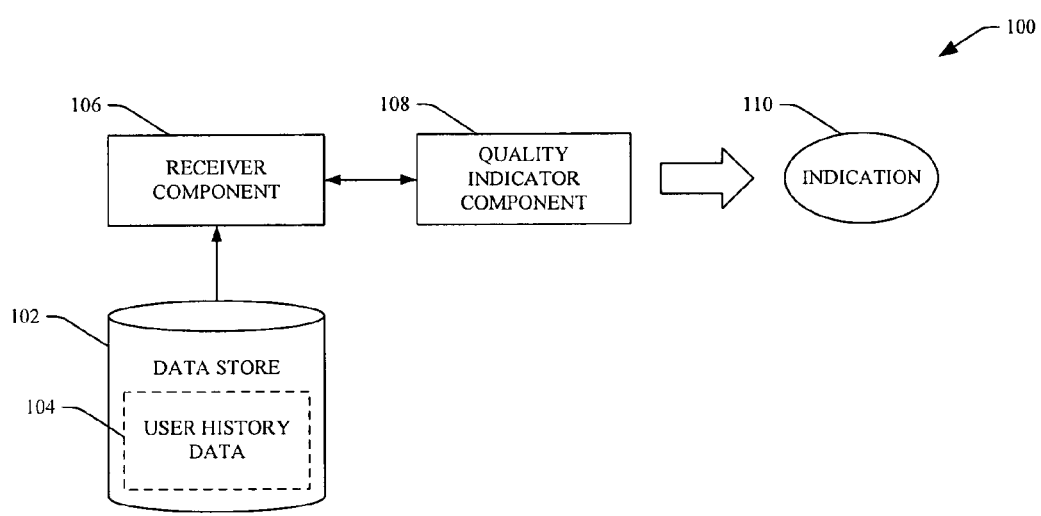
FIG. 1 is a functional block diagram of an example system that facilitates determining an indication of quality of a tier assignment.

Various technologies pertaining to determining quality of a tier assignment, generating an improved tier assignment, and automatically updating a tiering policy will now be described with reference to the drawings, where like reference numerals represent like elements throughout. In addition, several functional block diagrams of example systems are illustrated and described herein for purposes of explanation; however, it is to be understood that functionality that is described as being carried out by certain system components may be performed by multiple components. Similarly, for instance, a single component may be configured to perform functionality that is described as being carried out by multiple components.

With reference to FIG. 1, an example system 100 that facilitates outputting an indication of quality of a tier assignment with respect to a tiered storage system (not shown) is illustrated. Pursuant to an example, a tiered storage system may be a search engine index with multiple tiers, wherein a first (highest) tier may be more costly and have a relatively small amount of storage space, but retrieval time for digital items retrieved from the first tier may be less than retrieval times for digital items retrieved from other tiers (lower tiers). A second tier may be less expensive and have more storage space than the first tier, but retrieval time may be greater when compared to retrieval time corresponding to the first tier. In another example, the tiered storage system may include tiers of storage used in connection with a database management system. For example, a server used in a database management system may have a hard drive, random access memory, and high-speed random access memory, which can each be a tier.

The system 100 includes a data store 102 that comprises user history data 104. The user history data 104 may include, for example, queries issued by users, search results provided to the users in response to the queries, search results selected by users in response to being provided with the search results, and/or other suitable information. In an example, the user history data 104 can be accumulated by monitoring user interaction with respect to a search engine. For instance, a toolbar plugin may be installed in a browser, and queries entered into the browser may be collected by the toolbar plugin, as well as search results returned in response to the queries, user selection of particular search results, and the sequence of pages viewed by the user after submitting the query.

A receiver component 106 receives a subset of the user history data 104. A quality indicator component 108 is in communication with the receiver component 106 and receives the subset of user history data 104 from the receiver component 106. The quality indicator component 108 can generate an indication 110 of quality of a tier assignment, wherein the tier assignment indicates where digital items are to be assigned in a tiered storage system. For instance, the indication of quality may conform to a tier assignment quality metric, which is described in detail below. In addition, operation of the quality indicator component 108 is described in greater detail below.

Figure 2:
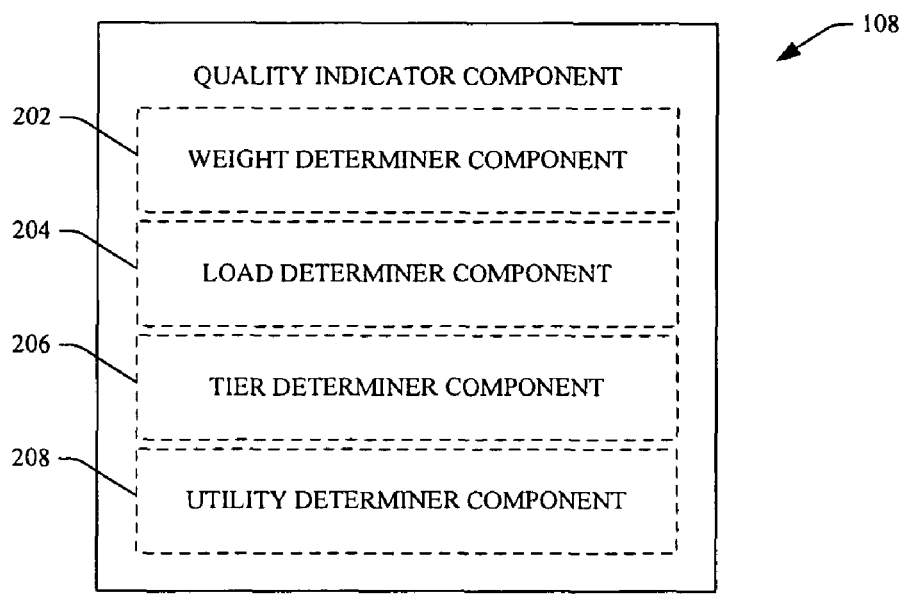
FIG. 2 is a functional block diagram of an example component that generates an indication of quality of a tier assignment.

Now referring to FIG. 2, an example of the quality indicator component 108 is illustrated. The quality indicator component 108 includes a weight determiner component 202, a load determiner component 204, a tier determiner component 206, and a utility determiner component 208. The weight determiner component 202 determines a weight that is assigned to each query used by the quality indicator component 108 to generate an indication of quality of a tier assignment corresponding to a tiered storage system. In an example, the weight determined by the weight determiner component 202 may be based at least in part upon frequency of issuance of the query (as ascertained from query logs, for example).

The load determiner component 204 determines the system load observed when a particular query was executed by a search component (e.g., search engine, database system, . . . ). The system load may be based at least in part upon a number of queries processed by the search component while the particular query was processed, a number of processing cycles dedicated to retrieving search results while the particular query was executed, or how "busy" the search component was in general.

The tier determiner component 206 can determine a probability that a certain tier will be the last tier searched over for digital items (with respect to the particular query) under the system load determined by the load determiner component 204. Generally, when a query is entered into a search component (e.g., a search engine), retrieval is first performed in higher tiers that are typically smaller but have faster access and retrieval times when compared to lower tiers. Depending on the number and quality of results obtained in the higher tiers as well as a current system load, retrieval may or may not be performed in lower tiers. Accordingly, as noted above, the tier determiner component 206 can determine a probability that a certain tier will be the last tier searched over for digital items (with respect to the particular query and under the determined system load). The probability can be determined for each tier in a tiered storage system.

The utility determiner component 208 determines an indication of search result quality (with respect to a particular query) when retrieval ends in a certain tier, wherein the indication of search result quality can be computed using any suitable metric. In an example, Normalized Discounted Cumulative Gain (NDCG) can be used to determine the indication of search result quality. In another example, Mean Average Precision (MAP) can be used to determine the indication of search result quality. In yet another example, Q-measure can be used to determine the indication of search result quality. Accordingly, it can be discerned that the utility determiner component 208 can utilize any suitable mechanisms/metrics to determine an indication of search result quality with respect to the particular query when retrieval ends in the certain tier.

The weight determined by the weight determiner component 202, the system load determined by the load determiner component 204, the probability determined by the tier determiner component 206, and the indication of search result quality determined by the utility determiner component 208 may be used by the quality indicator component 108 to determine an indication of quality of a tier assignment.

Pursuant to an example, the following algorithm can be used to define a metric of tier assignment quality, and can be employed by the quality indicator component 108 to determine an indication of quality of a tier assignment:

$$TQ(T(D), L) = \sum_{q \in Q} w(q) \sum_{t=1 \to k} P(t \mid q, T(D), L) \times \text{Utility}(t, q, T(D)), \quad (1)$$

where $D = \{d_1, \ldots, d_{|D|}\}$ is the set of all digital items ($d_i$) that are to be stored in k tiers $T_1, \ldots T_k$ that have corresponding capacities $|T_1|, \ldots, |T_k|$; $t(d_i)$ is the tier assignment for each item in the set of digital items D, where $t(d_i)$ can have values $1, \ldots, k$; $T(D) = \{t(d_i), \ldots, t(d_i)\}$ is the overall set of tier assignments; $TQ(T(D),L)$ is a measure of tier assignment quality for a current system load L; Q is a set of all possible queries; $w(q)$ is a weight (e.g., relative importance) of a query q; $P(t|q, T(D), L)$ is the probability that the t-th tier will be the lowest tier visited during retrieval under the current system load L; and $\text{Utility}(t, q, T(D))$ is a measure of search result quality obtained when retrieval ends in the t-th tier. Algorithm (1) thus computes an expectation of overall tier assignment quality over all possible queries for the given tier assignment over the probability distribution of ending retrieval in each tier.

It can be discerned that the number of all possible queries, however, is infinite. Accordingly, a set of observed queries Q' may be used by the quality indicator component 108 as an approximation of the distribution of all possible queries. In an example, these observed queries Q' can be randomly selected from a data repository that includes multiple observed queries (e.g., the user history data 104), where the probability of selecting any query $q \in Q'$ can be computed as the likelihood of selecting a random query received by a search component (e.g., search engine, database management system, . . . ). In another example, the set of observed queries Q' may be selected such that they are representative of all possible queries. For instance, the queries Q' may be selected such that a number of queries that have a certain length (as measured in words, characters, or the like) do not exceed a threshold. In addition, queries that are directed at different subject matter can be selected. In yet another example, the queries Q' may be selected based upon an amount of user data that is associated with such queries. For instance, the queries Q may be limited to queries that have sequential user data associated therewith, such as user clicks on one or more search results and/or advertisements that are provided in response to the queries. It is to be understood that any suitable manner for selecting a subset of observed queries is contemplated and intended to fall under the scope of the hereto-appended claims.

For every selected query q in Q', a relevant result set $R(q) = \{d_{q,1}, \ldots, d_{q,M}\}$ can be constructed by the quality indicator component 108 that includes no more than M items, wherein the items may be partially ordered from most relevant to least relevant. In an example, the result set may incorporate digital items that are frequently selected/visited by users following submission of the query to a search component, where frequency of selection/visitation can be combined with the time that users spent viewing the digital items; and/or digital items returned by a search component as relevant results for the query across all tiers of a tiered storage system.

Using the queries Q' and corresponding result sets, the following algorithm can be used to define a metric of tier assignment quality, and can be employed by the quality indicator component 108 to determine an indication of quality of a tier assignment:

$$TQ(T(D), L, Q') = \sum_{q \in Q'} w(q) \sum_{t=1 \to k} P(t \mid q, T(D), L) \times \text{Utility}(t, R(q), T(D)), \quad (2)$$

where TQ(T(D), L, Q') is a measure of tier assignment quality for a current system load L with respect to the set of queries Q'; and Utility(t, R(q), T(D)) is a measure of search result quality obtained when retrieval ends in the t-th tier.

As noted above, the quality indicator component 108 can determine an indication of quality of a tier assignment. More particularly, the weight determiner component 202 can determine weights (w) for each query in the set of queries Q'. The load determiner component 204 can determine the system load L present for each query in the set of queries Q'. The tier determiner component 206 can determine P(t|q, T(D), L), and the utility determiner component 208 can determine Utility(t, R(q), T(D)). In an example, utility determiner component 208 can use normalized discounted cumulative gain (NDCG) to determine Utility(t, R(q), T(D)). The utility determiner component 208 can employ other mechanisms to measure utility; examples include Mean Average Precision (MAP), and Q-measure. These examples are not intended to be limiting, as other mechanisms to measure utility may be employed and are contemplated.

In a particular example, the utility determiner component 208 can utilize the following algorithm to determine the measure of search result quality when retrieval ends in the t-th tier, wherein the algorithm is a modification of NDCG:

$$\text{Utility}_{NDCG}(t, R(q), T(D)) = N \sum_{d \in R_t(q)} \frac{2^{rel(d)} - 1}{\log(\text{rank}(d) + 1)} \quad (3)$$

where N is a normalization factor, $R_t(q)$ is the ordered subset of digital items in R (q) stored in tiers 1 through t, rel(d) is a relevance score for digital item d, and rank (d) is the rank position in $R_t(q)$ of the digital item. Note that rank (d) can depend on t if more relevant digital items reside in lower (deeper) tiers; these may not be retrieved if retrieval does not go beyond tier t. As noted above, using a modification of NDCG is but one possible measure of search result quality for a particular query given current tier assignments, and other measures can be utilized, such as the proportion of relevant results retrieved, etc.

As can be discerned from the above, the user history data 104 (FIG. 1) can be used to construct the set of queries Q' and the corresponding result set R(q) that can be employed to evaluate a tier assignment. P(t|q, T(D), L) can be instantiated for a particular system to reflect a tiering policy used in tiered storage system for forwarding queries to the t-th tier under an observed load L, provided a current tier assignment T(D). Then, given alternative tier assignments (e.g., $T_1(D)$ and $T_2(D)$), a preferred assignment can be selected by computing TQ. Additionally, the quality indicator component 108 can use TQ to investigate the expected quality of search results under varying loads (and thus the quality of tier assignments under different loads), as well as for different instantiations of a tiering policy used for forwarding queries to different tiers, as described in detail below.

Figure 3:
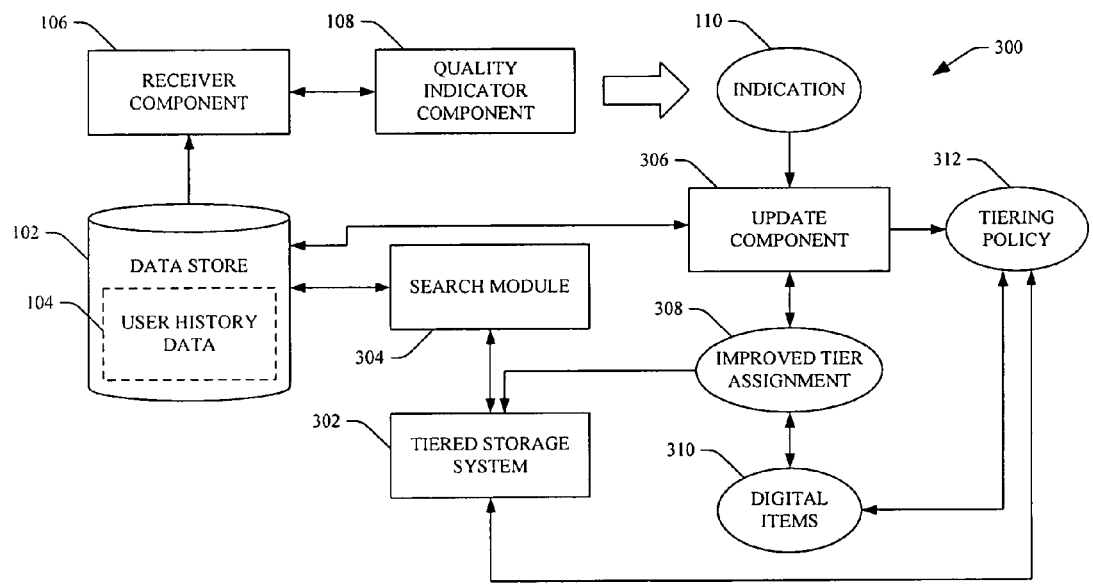
FIG. 3 is a functional block diagram of an example system that facilitates generating an improved tier assignment.

Referring now to FIG. 3, an example system 300 that facilitates automatically updating a tier assignment with respect to a tiered storage system is illustrated. The system 300 includes a tiered storage system 302 that may include a plurality of tiers, wherein each of the tiers may be used to store one or more digital items, such as web pages, images, documents, and/or the like. A search component 304 performs searches for digital items stored in the tired storage system 302 based at least in part upon received queries. For example, the search component 304 can be a search engine that is configured to search through a tiered search index in response to receiving a query. In another example, the search component 304 may be a portion of a database management system used to search tiers of storage (e.g., memory, hard drive, . . . ) in response to receipt of a query. In yet another example, the search component 304 may be a desktop search module used to search items on a computer. Other search components are also contemplated.

The data store 102 retains user history data 104 that can be received from the search component 304. For example, queries provided to the search component 304, user actions upon being provided with search results, and sets of search results provided to the user in response to the query can be stored in the user history data 104. The receiver component 106 receives a subset of the user history data 104. As described above, the quality indicator component 108 can generate the indication 110 of quality of a tier assignment. In an example, the indication 110 may be stored in a computer readable medium upon being generated by the quality indicator component 108.

An update component 306 can receive the indication 110 and an output an improved tier assignment 308 based at least in part upon the indication 110. For example, the update component 306 can receive other possible tier assignments and corresponding indications of quality and select a tier assignment that corresponds to a highest indication of quality. For example, the update component 306 may use heuristics to determine an optimal or substantially optimal tier assignment (with respect to a defined tier assignment quality metric). In another example, machine learning techniques, which will be described in greater detail below, can be utilized by the update component 306 to output the improved tier assignment 308. Digital items 310 may then be assigned to the tiered storage system 302 based at least in part upon the improved tiering assignment 308.

With more detail relating to the update component 306, the indication 110 of quality of an initial tier assignment can provide a basis for developing algorithms/techniques for identifying improved tier assignments for digital items. Given a space of possible tier assignments $T=\{T^{(1)}(D), \ldots, T^{(N)}(D)\}$, identifying a tier assignment $T^*(D)$ that has an optimal or substantially optimal indication of tier quality as output by algorithm (2) can be defined as follows:

$$T^*(D) = \underset{T^i(D) \in T}{\operatorname{argmax}} TQ(T^{(i)}(D), L, Q'). \tag{4}$$

The set of possible tier assignments T can be defined as a set of alternative assignments or groups of assignments that are parameterized by some variables, such as parameters of a static ranking scheme. Then the update component 306 can use machine learning techniques to search a set of alternative assignments to identity one of such assignments as being optimal or substantially optimal. For example, the update component 306 may use a neural network, a regression tree, a Bayesian network, or any other suitable machine learning technique to determine a tiering assignment that optimizes or substantially optimizes the indication 110.

Furthermore, update component 306 can determine a tiering policy 312 that is used to assign the digital items 310 to particular tiers in the tiered storage system 302 based at least in part upon the improved tier assignment 308 and/or a subset of the user history data 104. A tiering policy may be used to determine which tiers of the tiered storage system 302 to use when storing digital items. For instance, the tiering policy 312 may take into account various features of searchable digital items that may be returned in response to one or more queries. Such features may include a static ranking derived from a link structure (e.g., page rank of a digital item), a rank of a domain that includes the digital item, a popularity of the digital item among search engine results, a number of words in a digital item, color spectrums of images in a digital item, etc. Each of these features may be parameterized by the update component 306. In other words, the features may be assigned weights that are used by the tiering policy 312 to assign a corresponding digital item to a tier of the tiered storage system 302. The update component 306 can use machine learning techniques to learn the weights that are to be assigned to the features, and the tiering policy may be used to assign digital items to tiers of the tiered storage system 302.

Figure 4:
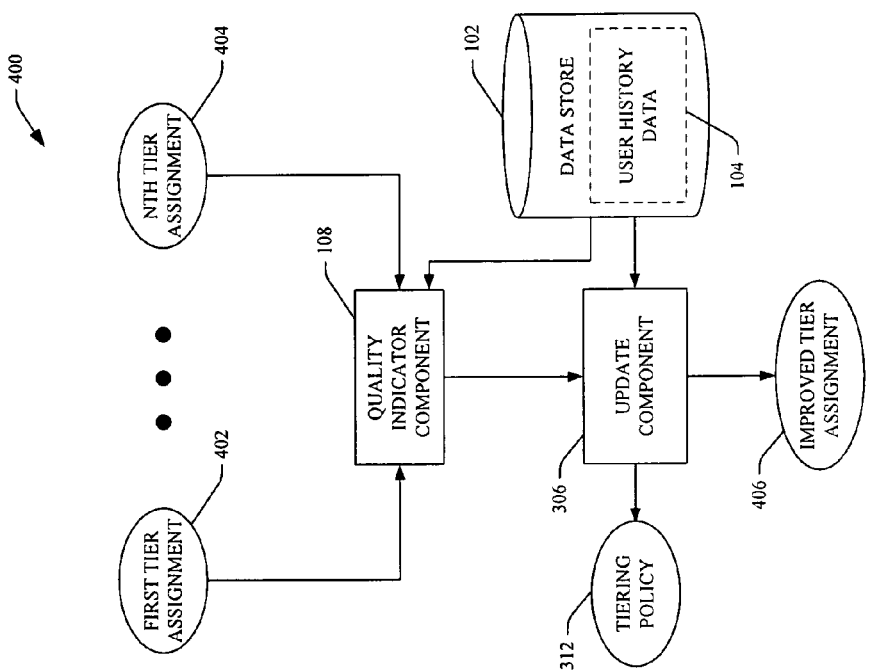
FIG. 4 is a functional block diagram of an example system that facilitates generating an improved tier assignment.

With reference now to FIG. 4, an example system 400 that facilitates updating a tier assignment based on multiple possible tier assignments is illustrated. The system 400 includes the quality indicator component 108 that can generate an indication of quality of tier assignments. More specifically, the quality indicator component 108 can generate indications of quality of a first tier assignment 402 through an Nth tier assignment 404 based at least in part the user history data 104. The update component 306 can receive the indications of quality (which may be values that correspond to a defined tier assignment quality metric) and combine several different tier assignments in such a manner that a resulting improved tier assignment 406 has a higher quality (as determined by the quality indicator component 108) than any of the individual tier assignments. The update component 306 can combine different tier assignments based at least in part upon the indications of quality corresponding to the tier assignments 402-404 and/or a subset of the user history data 104.

In more detail, combining tier assignments may be a particular instantiation of algorithm (4), where the set T of possible assignments may be a set of possible combinations of individual tier assignments. The set of possible combinations can be parameterized by some variables, such as parameters of a static ranking scheme. The update component 306 can use machine learning techniques to determine a combination of individual tier assignments that is optimal or substantially optimal with respect to a defined tier assignment quality metric. In addition, as discussed above, the update component 306 can generate or update the tiering policy 312 that is used to assign digital items to tiers of a tiered storage system based at least in part upon the improved tier assignment 406.

With reference now to FIGS. 5-8, various example methodologies are illustrated and described. While the methodologies are described as being a series of acts that are performed in a sequence, it is to be understood that the methodologies are not limited by the order of the sequence. For instance, some acts may occur in a different order than what is described herein. In addition, an act may occur concurrently with another act. Furthermore, in some instances, not all acts may be required to implement a methodology described herein.

Moreover, the acts described herein may be computer-executable instructions that can be implemented by one or more processors and/or stored on a computer-readable medium or media. The computer-executable instructions may include a routine, a sub-routine, programs, a thread of execution, and/or the like. In addition, tier assignments in a search engine and/or database management system can be determined based at least in part upon the methodologies described herein. Still further, results of acts of the methodologies may be stored in a computer-readable medium, displayed on a display device, and/or the like.

Figure 5:
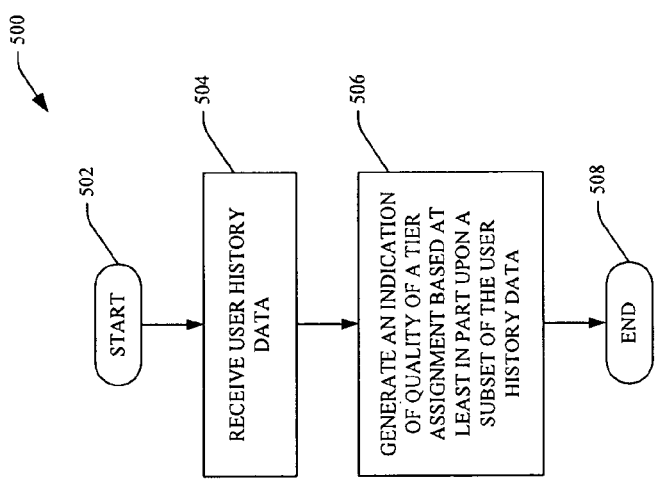
FIG. 5 is a flow diagram that illustrates an example methodology for generating an indication of quality of a tier assignment.

Referring specifically to FIG. 5, an example methodology 500 for determining an indication of quality of a tier assignment is illustrated. The methodology 500 starts at 502, and at 504 user history data is received. For example, the user history data can include queries that were issued by users, search results provided to the users in response to the queries, user selections of the search results and the sequence of pages viewed by the user after issuing the query. The user history data may also include labeled data, wherein relevance of search results to queries is explicitly defined by users.

At 506, an indication of quality of a tier assignment is generated based at least in part upon a subset of the user history data. The methodology 500 completes at 508.

Figure 6:
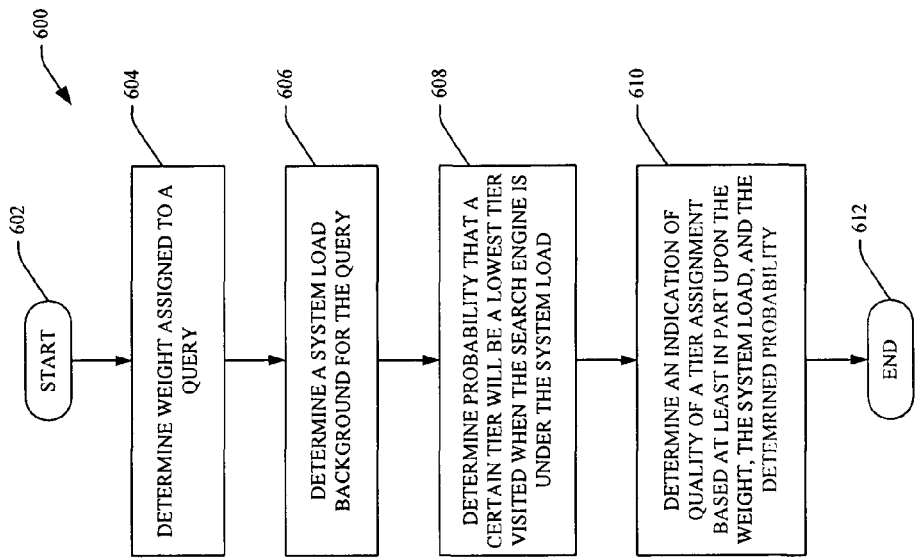
FIG. 6 is a flow diagram that illustrates an example methodology for generating an indication of quality of a tier assignment.

Turning now to FIG. 6, a methodology 600 that facilitates determining an indication of quality of a tier assignment with respect to a tiered storage system is illustrated. The methodology 600 starts at 602, and at 604 a weight assigned to a query is determined. For example, the weight may depend on frequency of issuance of the query. In another example, a user or users may explicitly assign a weight to the query to indicate a relative importance of the query.

At 606, a system load background for the query is determined. As noted above, the system load may be related to a number of queries that are being processed by a search component, such as a search engine or database management system, at a time that the query is processed.

At 608, a probability that a certain tier will be a lowest tier visited when the search engine is under the system load is determined. For example, this probability can be determined for each tier used to store searchable digital items.

At 610, an indication of quality of a tier assignment is determined, where the tier assignment is used to store digital items that correspond to the query in a tiered storage system. The indication of quality is determined based at least in part upon the weight, the system load, and the determined tier probability. In an example, the determined indication of quality may be stored, at least temporarily, in a computer-readable medium. The methodology 600 ends at 612.

Figure 7:
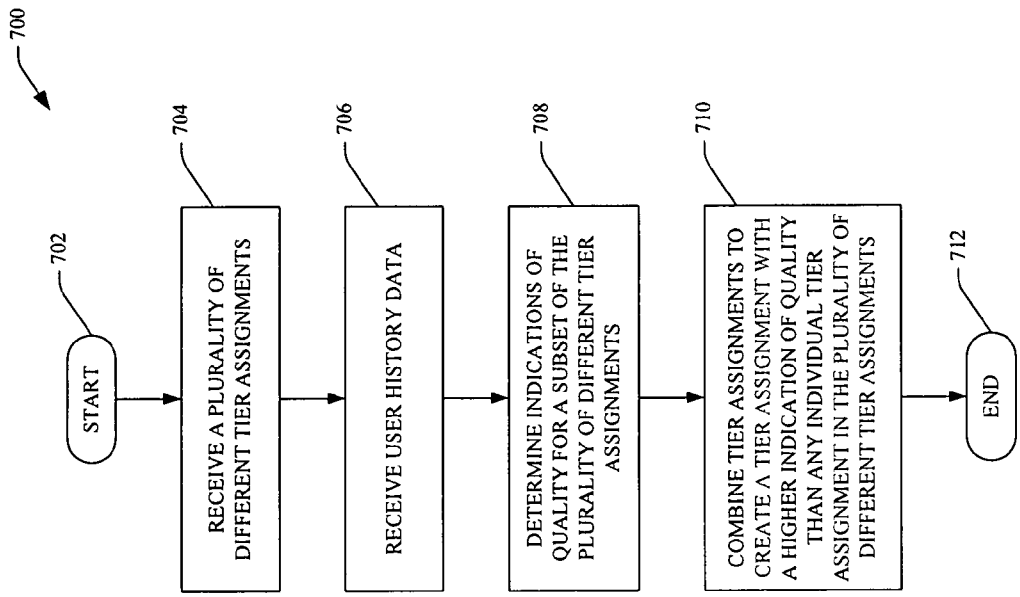
FIG. 7 is a flow diagram that illustrates an example methodology for outputting a tier assignment that is optimized or substantially optimized with respect to a tier assignment quality metric.

Referring now to FIG. 7, a methodology 700 for determining an optimal or substantially optimal tier assignment (e.g., optimized or substantially optimized for a defined tier assignment quality metric) is illustrated. The methodology 700 starts at 702, and at 704 a plurality of different tier assignments are received. At 706, user history data is received. As noted above, the user history data may include queries, search results provided in response to the queries, and/or user selections of search results provided in response to the queries.

At 708, indications of quality are determined for a subset of the plurality of different tier assignments. At 710, tier assignments are combined such that the resulting combination has a higher indication of quality than any individual tier assignment. The methodology 700 ends at 712.

Figure 8:
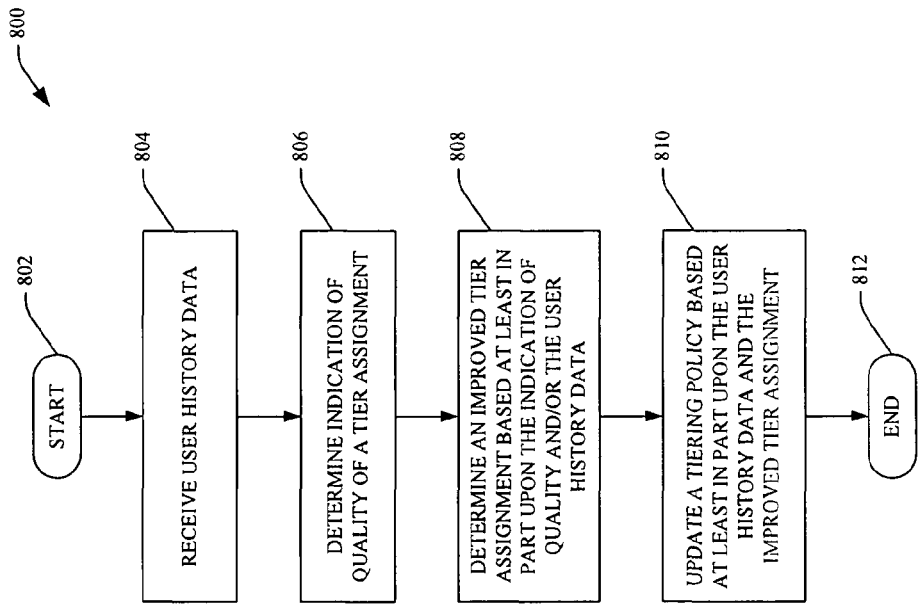
FIG. 8 is a flow diagram that illustrates an example methodology for updating a tiering policy.

With reference now to FIG. 8, a methodology 800 that facilitates updating a tiering policy is illustrated. In an example, a search engine that uses a tiering policy to assign digital items to tiers of a search engine index may use acts of the methodology 800 to update the tiering policy. The methodology 800 begins at 802, and at 804 user history data is received. At 806, an indication of quality of a tier assignment is determined. At 808, an improved tier assignment is determined based at least in part upon the user history data and/or the indication of quality determined at 806. At 810, a tiering policy is updated based at least in part upon the user history data and the improved tier assignment. For instance, the improved tier assignment may contemplate digital items that are related to the user history search data, and the tiering policy may be used to assign digital items that were not contemplated in the improved tier assignment to particular tiers. The methodology 800 ends at 812.

Figure 9:
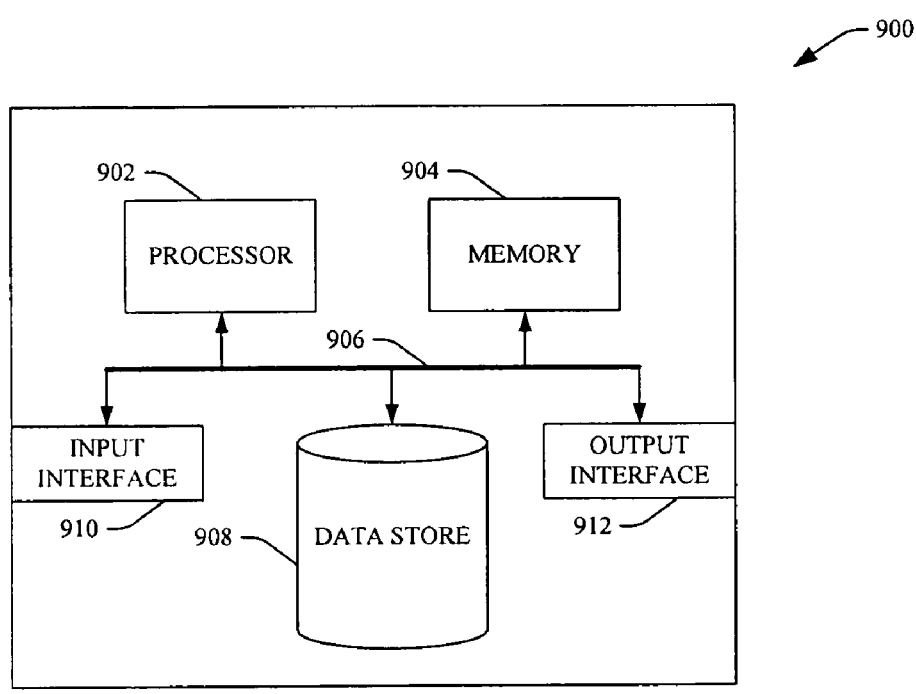
FIG. 9 is an example computing system.

Now referring to FIG. 9, a high-level illustration of an example computing device 900 that can be used in accordance with the systems and methodologies disclosed herein is illustrated. For instance, the computing device 900 may be used in a search engine system. In another example, the computing device 900 may be used in a database management system. The computing device 900 may be a server, or may be employed in devices that are conventionally thought of as client devices, such as personal computers, personal digital assistants, and the like. The computing device 900 includes at least one processor 902 that executes instructions that are stored in a memory 904. The instructions may be, for instance, instructions for implementing functionality described as being carried out by one or more components discussed above or instructions for implementing one or more of the methods described above. The processor 902 may access the memory by way of a system bus 906. In addition to storing executable instructions, the memory 904 may also store digital items, at least a portion of a tier assignment, indications of quality of one or more tier assignments, etc.

The computing device 900 additionally includes a data store 908 that is accessible by the processor 902 by way of the system bus 906. The data store 908 may include executable instructions, one or more tier assignments, indications of quality of tier assignments, user history data, labeled data, etc. The computing device 900 also includes an input interface 910 that allows external devices to communicate with the computing device 900. For instance, the input interface 910 may be used to receive queries from a user by way of a network. The computing device 900 also includes an output interface 912 that interfaces the computing device 900 with one or more external devices. For example, the computing device 900 may display search results by way of the output interface 912.

Additionally, while illustrated as a single system, it is to be understood that the computing device 900 may be a distributed system. Thus, for instance, several devices may be in communication by way of a network connection and may collectively perform tasks described as being performed by the computing device 900.

As used herein, the terms "component" and "system" are intended to encompass hardware, software, or a combination of hardware and software. Thus, for example, a system or component may be a process, a process executing on a processor, or a processor. Additionally, a component or system may be localized on a single device or distributed across several devices.

It is noted that several examples have been provided for purposes of explanation. These examples are not to be construed as limiting the hereto-appended claims. Additionally, it may be recognized that the examples provided herein may be permutated while still falling under the scope of the claims.

What is claimed is:

1. A method, comprising:
   receiving user history data;
   causing a processor to generate an indication of quality of a tier assignment used to store searchable digital items in a tiered storage system, the searchable digital items retrievable by way of querying, wherein the indication is based at least in part upon a subset of the user history data and indicates where a subset of the searchable digital items are desirably stored in the tired storage system; and
   causing the processor to generate an improved tier assignment for storage of the subset of the searchable digital items based at least in part upon the user history data, wherein generating the improved tier assignment comprises optimizing the improved tier assignment with respect to a tier assignment quality metric.

2. The method of claim 1, wherein the user history data comprises:
   queries provided to a search engine;
   results returned by the search engine with respect to the queries;
   digital items in the search results selected by one or more users; and
   a sequence of digital items accessed by a user after the user submits the queries.

3. The method of claim 1, wherein the user history data comprises:
- queries input to a database management system;
- results returned in response to the queries; and
- a sequence of items accessed by a user after the user submits the queries.

4. The method of claim 1, wherein the tiered storage system is a search engine index.

5. The method of claim 1, further comprising updating a tiering policy used to assign digital items to tiers of the tiered storage system based at least in part upon the improved tier assignment.

6. The method of claim 5, further comprising using machine learning techniques to parameterize the tiering policy.

7. The method of claim 1, wherein generating the indication comprises:
- determining a weight assigned to a query, wherein the weight is indicative of frequency of issuance of the query;
- determining a system load background for the query; and
- determining a probability that a certain tier will be a lowest tier visited when searching using the query when a search engine used to execute the query is under the system load.

8. The method of claim 1, wherein generating the indication comprises using the following algorithm:

$$TQ(T(D), L, Q') = \sum_{q \in Q'} w(q) \sum_{t=1 \to k} P(t \mid q, T(D), L) \times \text{Utility}(t, R(q), T(D)),$$

where $TQ(T(D), L, Q')$ is a measure of quality of the tier assignment, T represents a set of k available tiers, D is the set of digital items stored in the k tiers, L is a system load observed during processing of a query q in a set of queries Q', w is a weight assigned to the query q, P(t|q,T(D),L) is a probability that the t-th tier of the k tiers will be a lowest tier visited during retrieval under the system load L, Utility (t,R(q),T(D)) is a quality measure for the query q, and R(q) is a result set of digital items corresponding to the query q.

9. A system, comprising:
- a receiver component that receives user history data
- a quality indicator component that determines an indication of quality of a tier assignment used to store digital items that are retrievable by way of querying, wherein the quality indicator component generates the indication based at least in part upon a subset of the user history data and the tier assignment indicates where digital items are to be stored in a tiered storage system; and
- an update component that generates an improved tier assignment based at least in part upon the user history data, wherein the update component optimizes a tier assignment with respect to a tier quality metric to generate the improved tier assignment.

10. The system of claim 9, wherein the indication is indicative of the quality of a tier assignment for a search engine index.

11. The system of claim 9, wherein the update component combines a plurality of tier assignments to generate the improved tier assignment.

12. The system of claim 9, wherein the update component updates a tiering policy that is used to assign digital items to tiers of the tiered storage system based at least in part upon the improved tier assignment.

13. The system of claim 12, wherein the update component uses machine learning techniques to update the tiering policy.

14. The system of claim 9, wherein the quality indicator component comprises:
- a weight determiner component that determines weights assigned to one or more queries, wherein the weights are indicative of frequency of issuance of the one or more queries;
- a load determiner component that determines a system load on a search engine; and
- a tier determiner component that determines a probability that a certain tier will be a lowest tier visited in the tiered storage system when using the one or more queries when the search engine is under the system load.

15. The system of claim 9, further comprising a utility determiner component that determines a measure of search quality when search retrieval ends in a particular tier.

16. The system of claim 9, wherein a web search engine comprises the receiver component, the quality indicator component, and the update component.

17. Computer-readable data storage comprising instructions that, when executed by a processor, cause the processor to perform acts comprising:
- receiving user history data;
- generating an indication of quality of a tier assignment used to store searchable digital items in a tiered storage system of a search engine, the searchable digital items retrievable through executing a search that is based upon a query received by way of a browser, wherein the indication is based at least in part upon a subset of the user history data and indicates where a subset of the searchable digital items are desirably stored in the tired storage system; and
- generating an improved tier assignment for storage of the subset of the searchable digital items based at least in part upon the user history data, wherein generating the improved tier assignment comprises optimizing the improved tier assignment with respect to a tier assignment quality metric.

18. The computer-readable data storage of claim 17, wherein generating the indication comprises using the following algorithm:

$$TQ(T(D), L, Q') = \sum_{q \in Q'} w(q) \sum_{t=1 \to k} P(t \mid q, T(D), L) \times \text{Utility}(t, R(q), T(D)),$$

where $TQ(T(D), L, Q')$ is a measure of quality of the tier assignment, T represents a set of k available tiers, D is the set of digital items stored in the k tiers, L is a system load observed during processing of a query q in a set of queries Q', w is a weight assigned to the query q, P(t|q,T(D),L) is a probability that the t-th tier of the k tiers will be a lowest tier visited during retrieval under the system load L, Utility (t,R(q),T(D)) is a quality measure for the query q, and R(q) is a result set of digital items corresponding to the query q.

19. The computer-readable data storage of claim 17, wherein the tiered storage system is a web search engine index.

20. The computer-readable data storage of claim 17, wherein the user history data comprises:
  queries provided to the search engine;
  results returned by the search engine with respect to the queries;
  links in the search results selected by one or more users; and
  a sequence of links accessed by a user after the user submits the queries.

\* \* \* \* \*